US012636714B2

(12) United States Patent
Jin et al.

(10) Patent No.: US 12,636,714 B2
(45) Date of Patent: May 26, 2026

(54) QUICK CHANGE ARBOR

(71) Applicant: Innox Tools (Guangzhou) Co. Ltd.,
Guangzhou (CN)

(72) Inventors: Xianghua Jin, Hangzhou (CN); **Yunli
Zhao**, Guangzhou (CN)

(73) Assignee: **GUANGZHOU INNOX TOOLS CO.
LTD**, Guangzhou (CN)

( * ) Notice: Subject to any disclaimer, the term of this
patent is extended or adjusted under 35
U.S.C. 154(b) by 375 days.

(21) Appl. No.: 18/402,816

(22) Filed: Jan. 3, 2024

(65) Prior Publication Data

US 2025/0214156 A1     Jul. 3, 2025

(51) Int. Cl.
B23B 51/04          (2006.01)

(52) U.S. Cl.
CPC ...... B23B 51/0473 (2013.01); B23B 2205/02
(2013.01)

(58) Field of Classification Search
CPC ........................ B23B 51/0473; B23B 2205/02
See application file for complete search history.

(56) References Cited

U.S. PATENT DOCUMENTS

| | | | | |
|---|---|---|---|---|
| 8,360,696 | B2 * | 1/2013 | O'Keefe ............. | B23B 51/0473 |
| | | | | 408/239 R |
| 9,751,135 | B1 * | 9/2017 | Terris ................... | B23B 31/185 |

| | | | | |
|---|---|---|---|---|
| 12,472,567 | B1 * | 11/2025 | Lin ..................... | B23B 51/0473 |
| 2002/0131835 | A1 * | 9/2002 | Despres ............. | B23B 51/0453 |
| | | | | 408/204 |
| 2009/0238653 | A1 * | 9/2009 | O'Keefe ............. | B23B 51/0473 |
| | | | | 408/94 |
| 2009/0279971 | A1 * | 11/2009 | O'Keefe ............. | B23B 51/0473 |
| | | | | 408/239 R |
| 2011/0097169 | A1 * | 4/2011 | Kazda ................. | B23B 51/0473 |
| | | | | 408/204 |
| 2014/0126973 | A1 * | 5/2014 | Pamatmat ........... | B23B 51/0473 |
| | | | | 408/240 |
| 2014/0369775 | A1 * | 12/2014 | Lai ...................... | B23B 51/0426 |
| | | | | 408/209 |
| 2016/0279717 | A1 * | 9/2016 | Batho ................. | B23B 51/0473 |
| 2025/0196233 | A1 * | 6/2025 | Proulx ................. | B23B 51/044 |

FOREIGN PATENT DOCUMENTS

| | | |
|---|---|---|
| CN | 201244703 Y | 5/2009 |
| CN | 203887960 U | 10/2014 |
| CN | 210757558 U | 6/2020 |

* cited by examiner

*Primary Examiner* — Sean M Michalski
(74) *Attorney, Agent, or Firm* — JEEN IP LAW, LLC

(57)          ABSTRACT

The present invention provides a quick change arbor, which
can realize quick replacements of tools such as drill bit, hole
saw and batch head on electric drills. The quick change arbor
comprises an arbor main body, a pulling ring and a locking
part. In the present invention, the tool is positioned and
installed in an assembling position through the arbor main
body, and the locking part within the first guiding groove
abuts against the surface of the tool, so that the tool is tightly
locked within the assembling position, thus to effectively
eliminate the gaps occurred after the tool is assembled.

7 Claims, 11 Drawing Sheets

QUICK CHANGE ARBOR

TECHNICAL FIELD

The present invention belongs to the technical field of quick change arbors, and particularly relates to a quick change arbor.

BACKGROUND

A quick change arbor is a mechanical device that a drilling tool can be replaced rapidly. In the traditional drilling technique, tools such as drill bits and hole saws cannot be replaced rapidly, and various of the quick change arbors have been designed so far. However, these quick change arbors have complicated structures and high the manufacturing costs. Besides, a large axial gap between the tool and the quick change arbor causes problems such as big runout when the tool is used. Therefore, a quick change arbor is urgently needed to overcome the above shortcomings.

SUMMARY

The purpose of the present invention is to provide a quick change arbor, which can realize the quick clamping of the tool, and can eliminate the gaps between the tool and the quick change arbor after being clamped.

Based on this, the present invention provides a quick change arbor, comprising an arbor main body, a pulling ring and a locking part.

The arbor main body is provided with an assembling position, which is used for installing a tool.

The arbor main body is further provided with a first guiding groove, and the first guiding groove and a central axis of the assembling position are arranged obliquely. The first guiding groove is provided with a notch that communicates with the assembling position.

The locking part is arranged within the first guiding groove, and the locking member extends from the notch into the assembling position and abuts against the tool within the assembling position.

The pulling ring is movably arranged on the arbor main body, and the pulling ring is used for driving the locking part to move away from the notch along the first guiding groove. The arbor main body is further provided with an elastic component, and the elastic component is used for pushing and pressing the locking part toward the notch.

The quick change arbor as mentioned above, an inclination angle between the first guiding groove and a central axis of the assembling position is less than a self-locking angle.

The quick change arbor as mentioned above, the locking part is configured as a needle roller, when the locking part is located within the first guiding groove, a part of the locking part extends to the assembling position from the notch.

The quick change arbor as mentioned above, both ends of the locking part are overhanging ends that extend from both sides of the arbor main body, and both the pulling ring and the elastic component are in contact with the overhanging ends.

The quick change arbor as mentioned above, the pulling ring is sleeved on a periphery of the arbor main body.

The quick change arbor as mentioned above, the arbor main body is further provided with a baffle ring, and the elastic component is compressed between the baffle ring and the locking part.

The quick change arbor as mentioned above, the assembling position is used for installing the tool with a cylindrical periphery or the tool with a polygonal cross-section.

The embodiment of the present invention has the following beneficial effects.

The present invention provides a quick change arbor, the tool is positioned and installed in the assembling position through the arbor main body. Besides, the locking part within the first guiding groove abuts against the surface of the tool, so that the tool is tightly locked in the assembling position. In the present invention, the locking part is pushed to the tool under the action of the elastic component, so that the locking part remains in contact with the surface of the tool, which can effectively eliminate the gaps occurred after the tool is assembled, so that the tool can be assembled and used by inserting it directly. When the tool needs to be disassembled, the tool can be removed from the arbor main body by just pulling the pulling ring to drive the locking part away from the surface of the tool. Therefore, the installation and disassembly of the whole clamping device are very simple, and the locking part does not need to be matched with the tools with groove, which can be applied to more types of tools to be clamped and used.

BRIEF DESCRIPTION OF THE DRAWINGS

In order to more clearly illustrate the technical schemes in the embodiments of the present invention, the drawings used in the descriptions of the embodiments will be briefly introduced hereafter. Apparently, the following described drawings are merely a part of the embodiments of the present invention: other drawings can be obtained by those of ordinary skill in the art according to these drawings without any creative works.

DETAILED DESCRIPTION OF THE EMBODIMENTS

Figure 1:
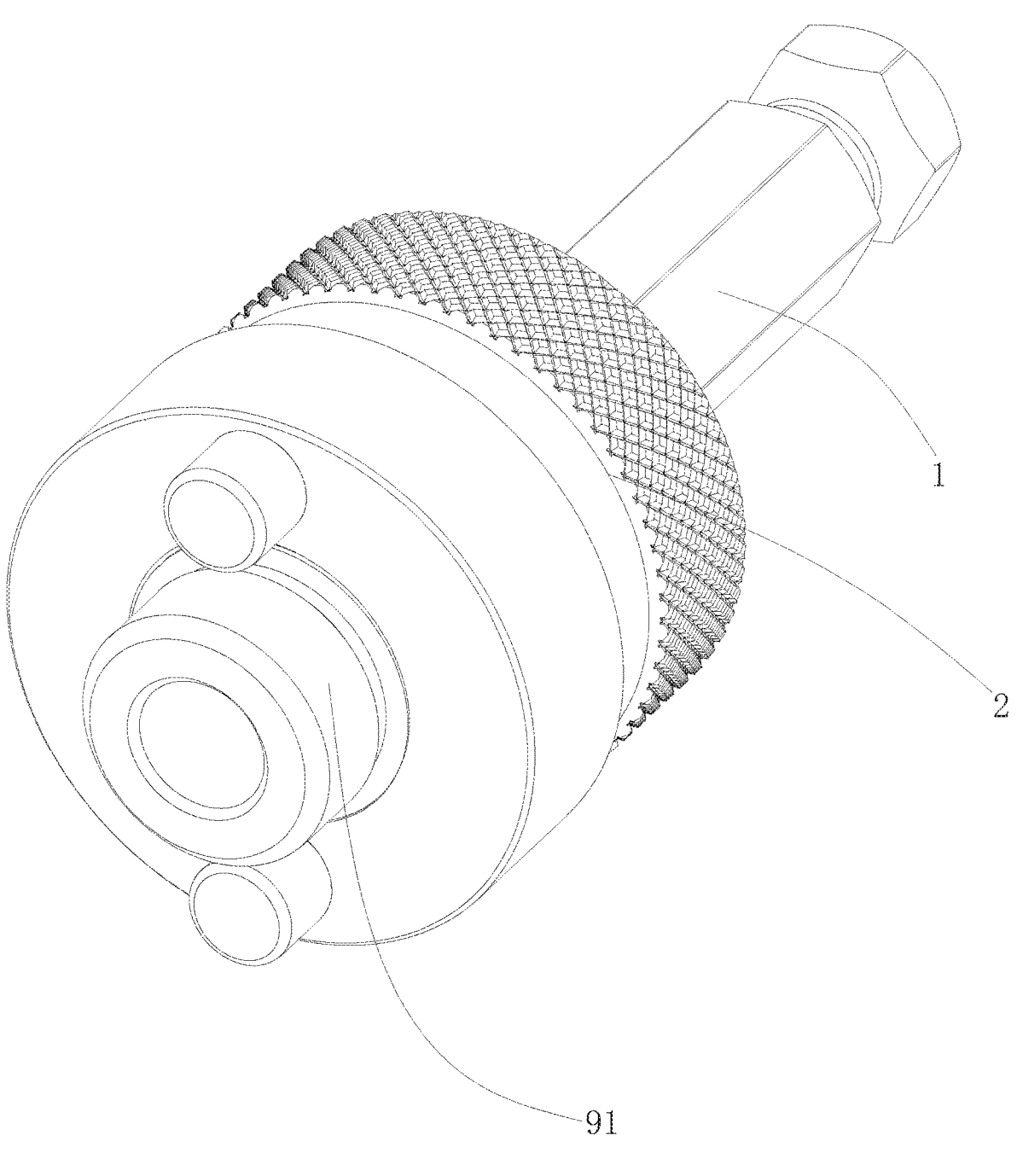
FIG. 1 is a schematic view that a quick change arbor clamps a tool according to an embodiment of the present invention.
Figure 2:
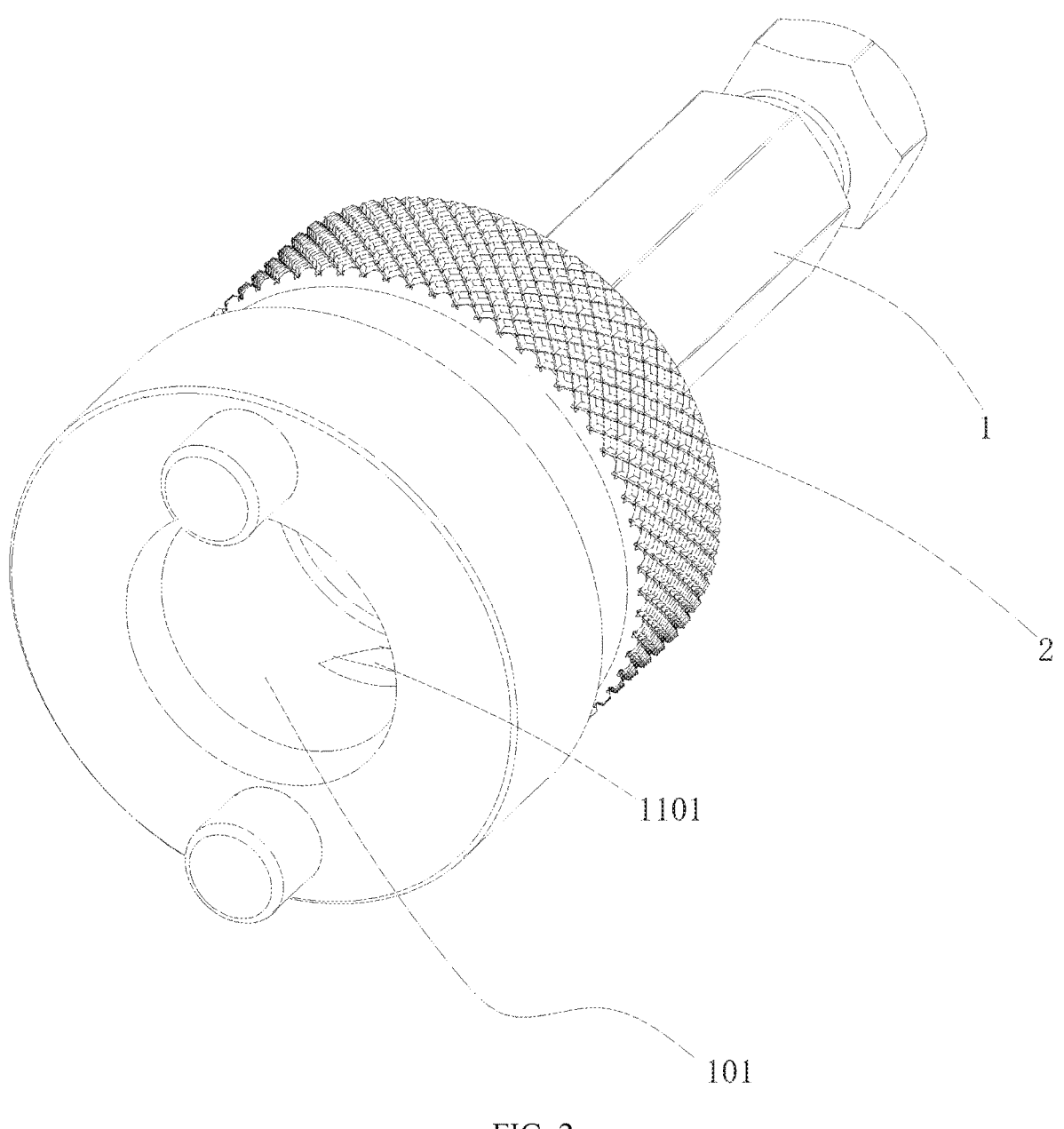
FIG. 2 shows the quick change arbor according to the embodiment of the present invention.
Figure 3:
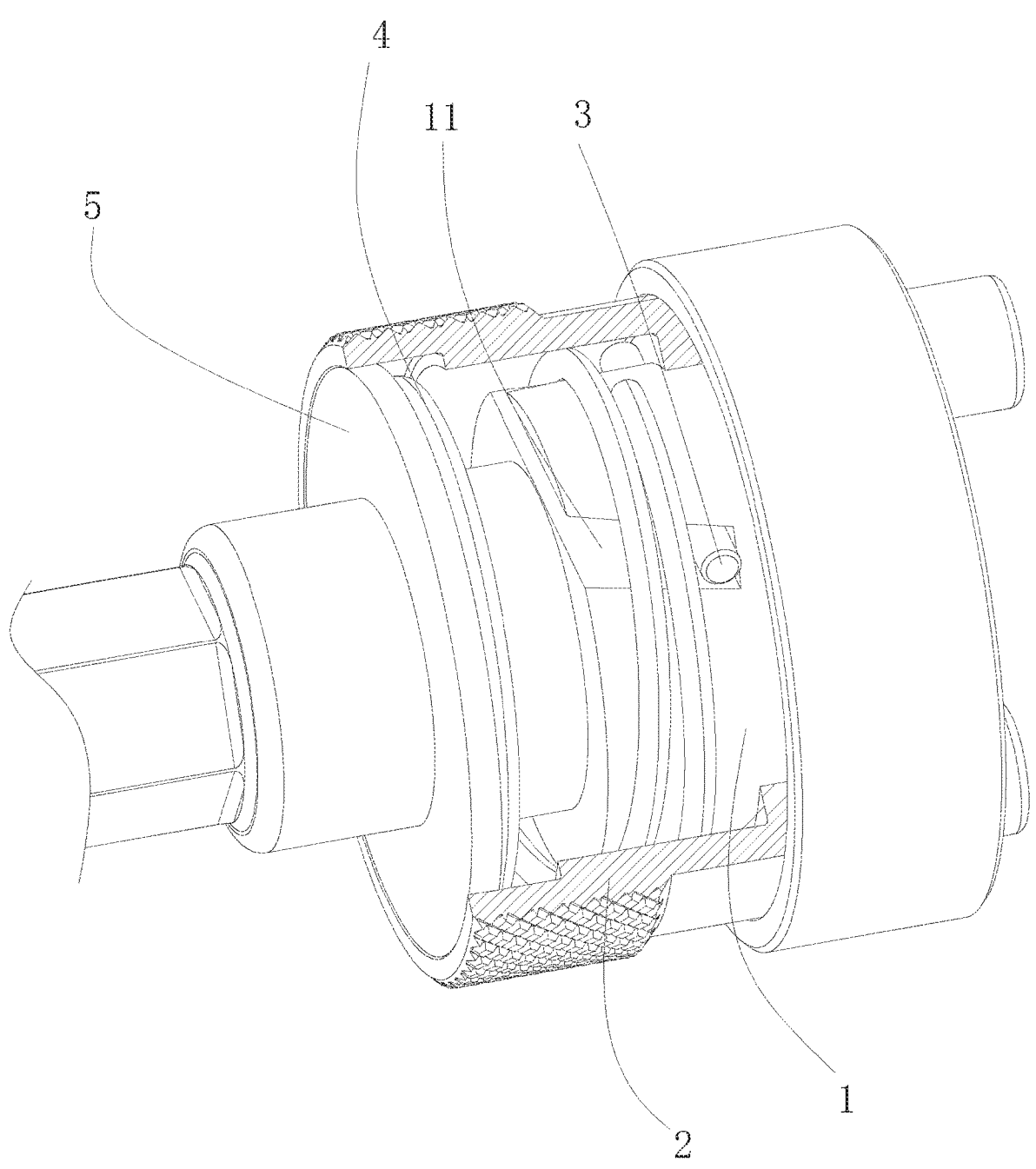
FIG. 3 is an internal structure view of FIG. 2.
Figure 4:
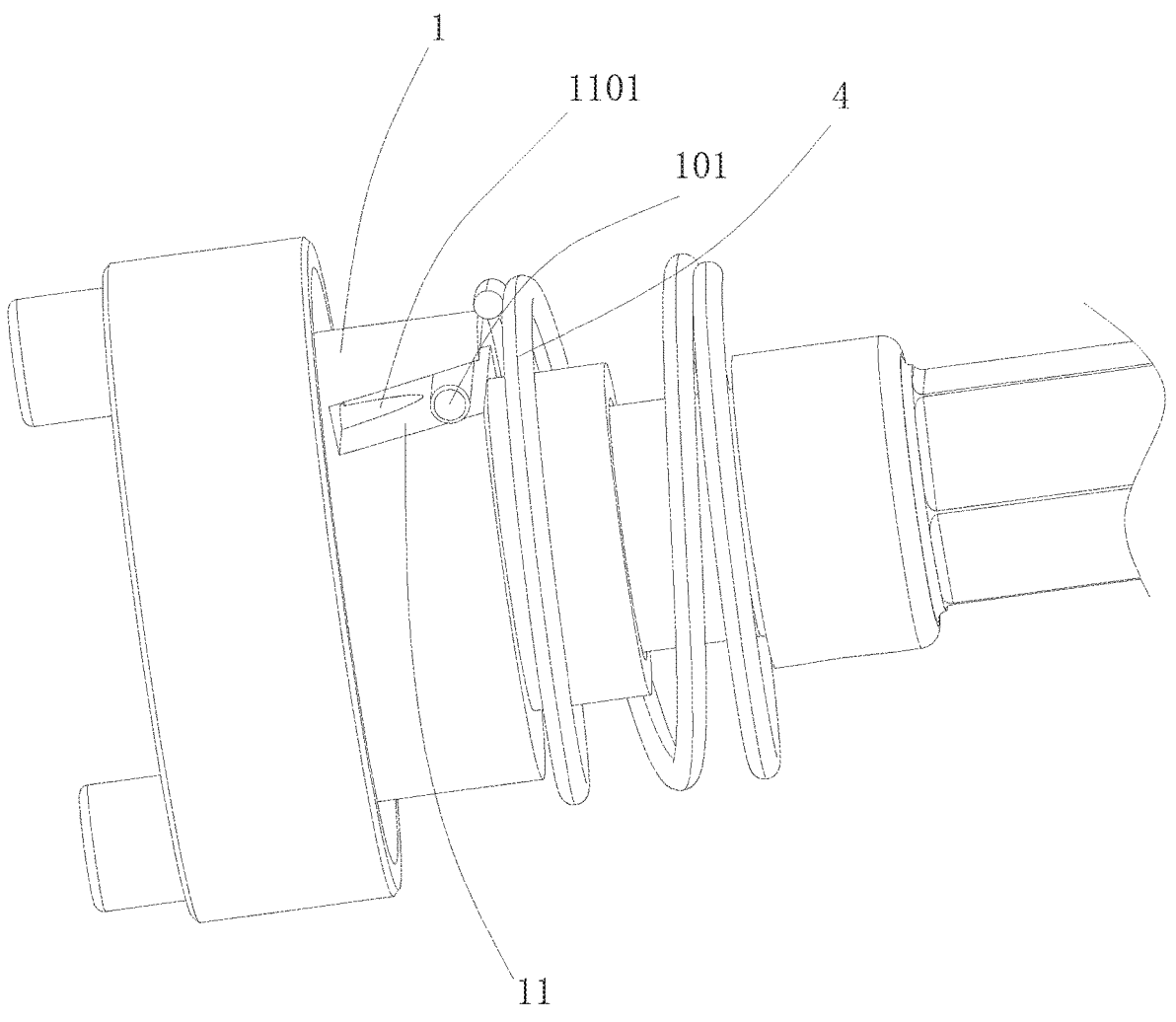
FIG. 4 is a structural view of FIG. 2 after a pulling ring is hidden.

The technical schemes in the embodiments of the present invention will be clearly and completely described hereafter in conjunction with the accompanying drawings in the embodiments of the present invention. Apparently, the described embodiments are merely a part of the embodiments of the present invention, rather than all the embodiments. Based on the embodiments of the present invention, all other embodiments obtained by those skilled in the art without creative work shall fall within the protection scope of the present invention.

As shown in FIG. 1 to FIG. 8, an embodiment of the present invention provides a quick change arbor, comprising an arbor main body 1, a pulling ring 2 and a locking part 3. The arbor main body 1 is provided with an assembling position 101, and the assembling position 101 is used for installing a tool. The arbor main body 1 is further provided with a first guiding groove 11, the first guiding groove 11 and a central axis of the assembling position 101 are arranged obliquely, and the first guiding groove 11 is provided with a notch 1101 that communicates with the assembling position 101. The locking part 3 is arranged within the first guiding groove 11, and the locking part 3 extends into the assembling position 101 from the notch 1101 and abuts against the tool in the assembling position 101. The pulling ring 2 is movably arranged on the arbor main body 1, and the pulling ring 2 is used for driving the locking part 3 to move away from the notch 1101 along the first guiding groove 11. The arbor main body 1 is further provided with an elastic component 4, which is used for pushing and pressing the locking part 3 toward the notch 1101. The present invention provides a quick change arbor, the tool is positioned and installed in the assembling position through the arbor main body. Besides, the locking part within the first guiding groove abuts against the surface of the tool, so that the tool is tightly locked in the assembling position. In the present invention, the locking part is pushed to the tool under the action of the elastic component, so that the locking part remains in contact with the surface of the tool, which can effectively eliminate the gaps occurred after the tool is assembled. When the tool needs to be disassembled, the tool can be removed from the arbor main body by just pulling the pulling ring to drive the locking part away from the surface of the tool. Therefore, the installation and disassembly of the whole clamping device are very simple, and the locking part does not need to be matched with the tools with groove, which can be applied to more types of tools to be clamped and used.

Figure 5:
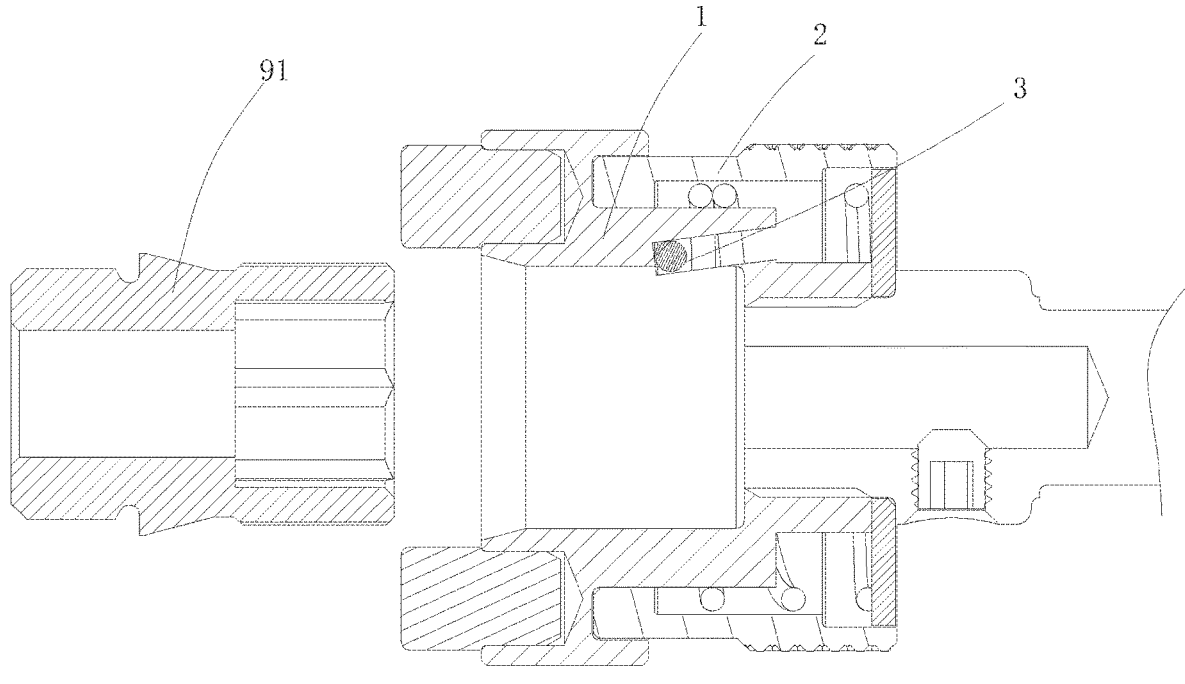
FIG. 5 is a cross sectional view showing a connector of the tool before being installing according to the embodiment of the present invention.
Figure 6:
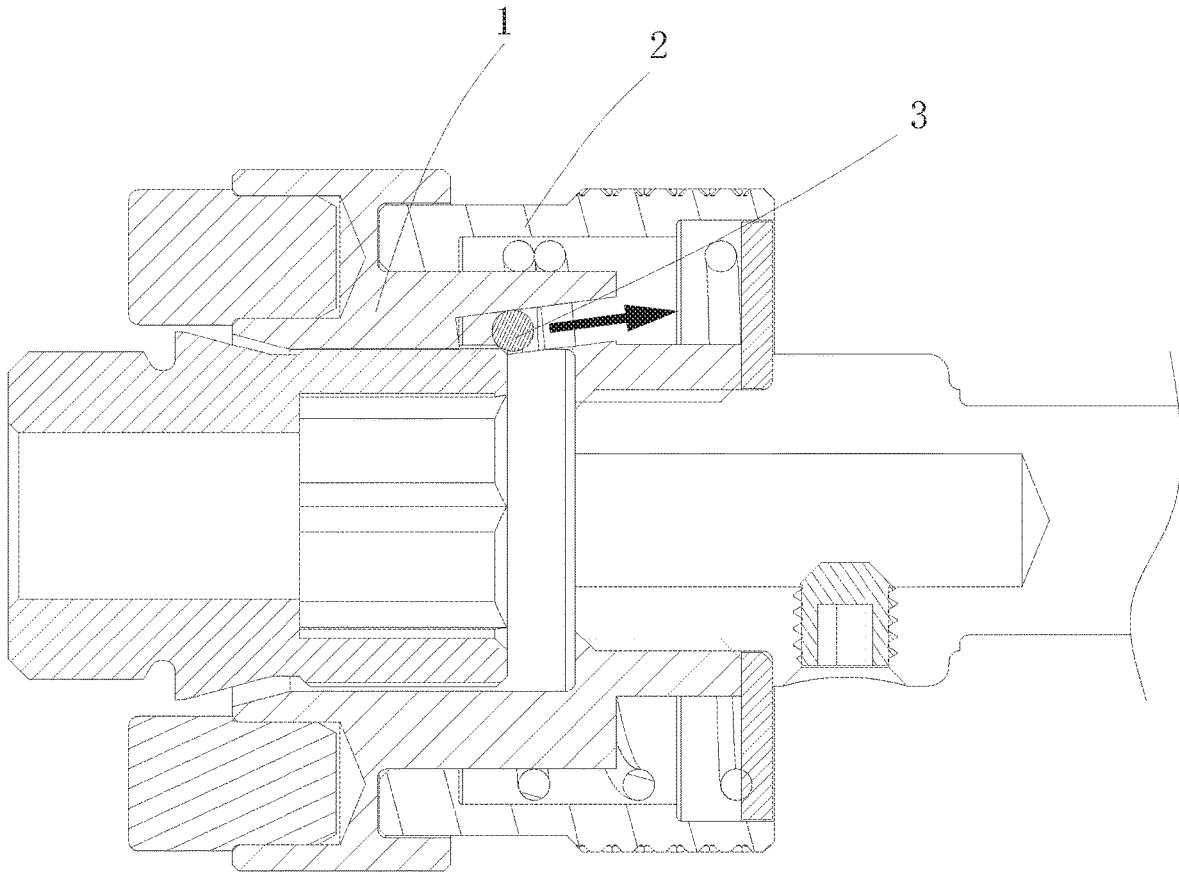
FIG. 6 is a cross sectional view showing the installation process of the connector of the tool according to the embodiment of the present invention.
Figure 7:
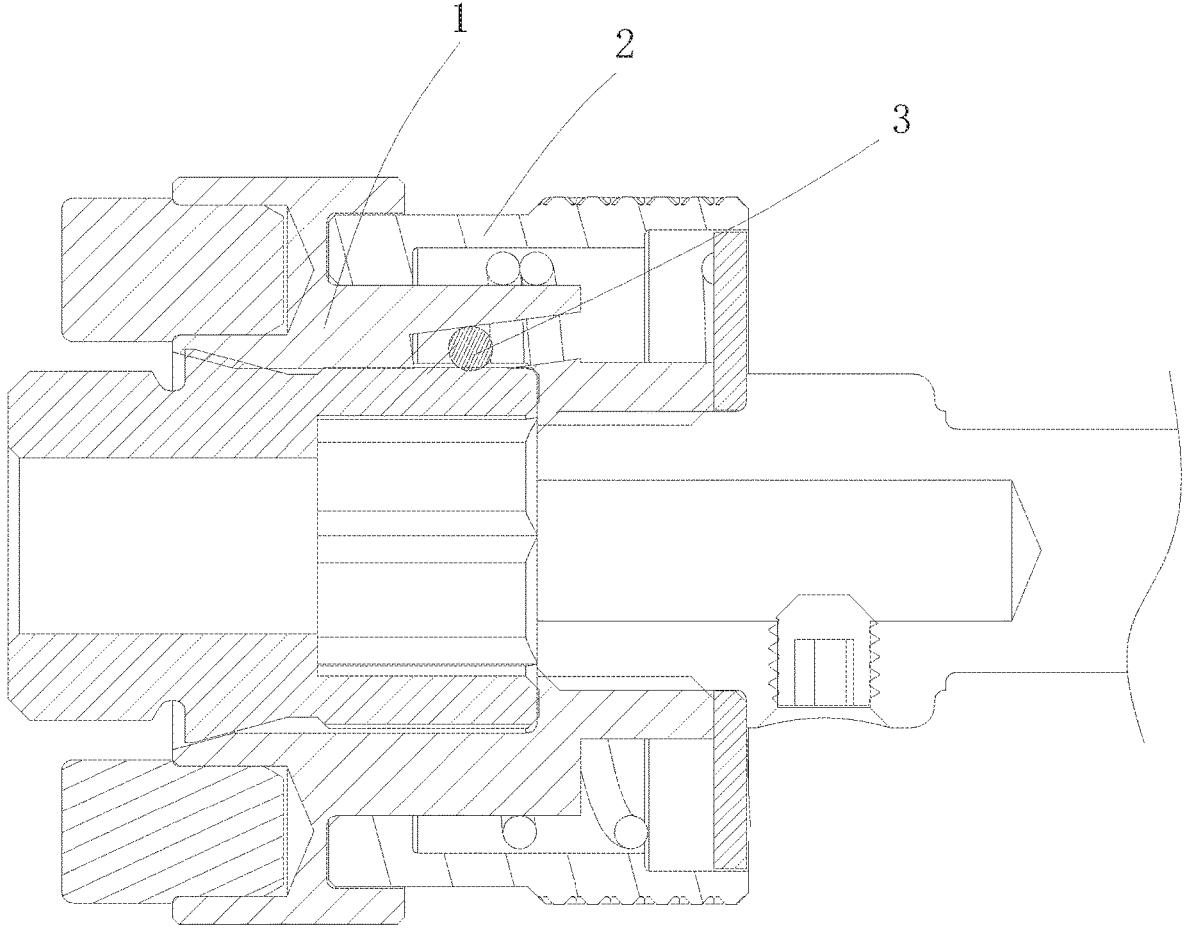
FIG. 7 is a cross sectional view that the connector of the tool has been installed according to the embodiment of the present invention.

In embodiment of the present invention, as shown in FIG. 5 to FIG. 7, when the tool is installed, the tool is inserted directly into the assembling position 101, also in contact with the part of the locking part 3 located in the assembling position 101, and the locking part 3 will be pushed due to the contact during the assembling process until the tool is installed completely. The locking part 3 is pushed back by the elastic component 4 so that it can remain in contact with the tool, thus to press the tool within the assembling position 101. This embodiment is simple to use. Compared with other quick change systems, which require three actions: control-insert-release control mechanism. The quick change system of the present embodiment only need to insert, and does not need to control or release. Thus, it can greatly improve the use efficiency of users. Especially in the case of aerial work or work in a narrow space that make inconvenient to replace tools with the users' both hands, the quick change arbor of the embodiment can replace tools with one hand, it can better reflect the simple and quick use function. For the user who is holding the electric tool with one hand, only the other hand is used to assemble or disassemble the tools, and there is no need to control the quick change mechanism with both hands.

In the embodiment of the present invention, the first guiding groove 11 is arranged obliquely for the following purposes. The locking part 3 moves along the first guiding groove 11 toward the notch 1101 while approaching the tool in the assembly position 101 in a radial direction. The locking part 3 remains in contact with the tool when pressed by the elastic component 4, thus a component force in the radial direction and a component force in the axial direction to the tool are generated on the contact surface. In this scheme, the component force in the radial direction is used to press the tool.

Figure 8:
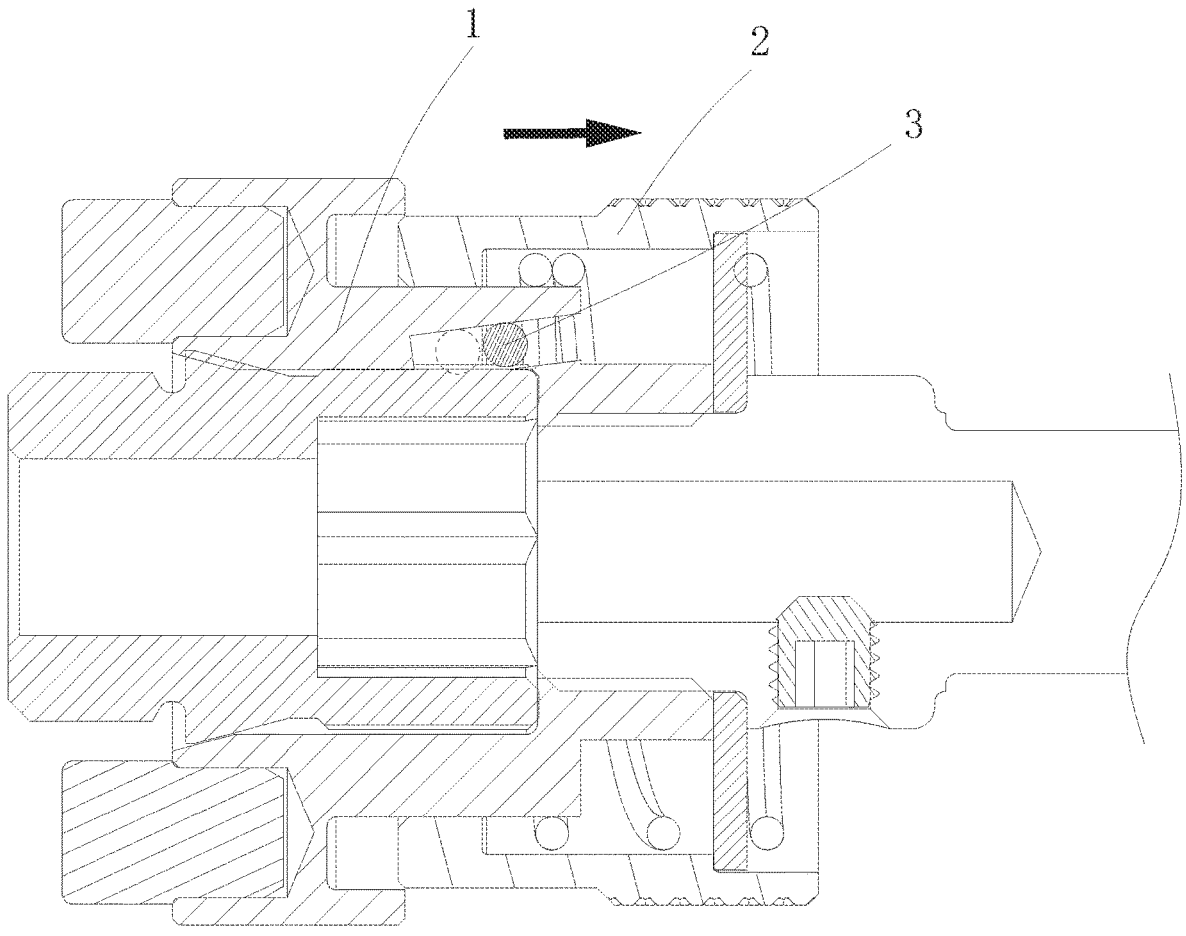
FIG. 8 is a cross sectional view that the connector of the tool is disassembled according to the embodiment of the present invention.

In the embodiment of the present invention, as shown in FIG. 8, the pulling ring 2 plays a role of unlocking, and the pulling ring 2 moves horizontally along a axial direction to drive the locking part 3 to move. An inclination angle between the first guiding groove 11 and a central axis of the assembling position 101 is less than a self-locking angle, otherwise the locking part 3 will lock automatically and cannot be driven by the pulling ring 2.

Figure 11:
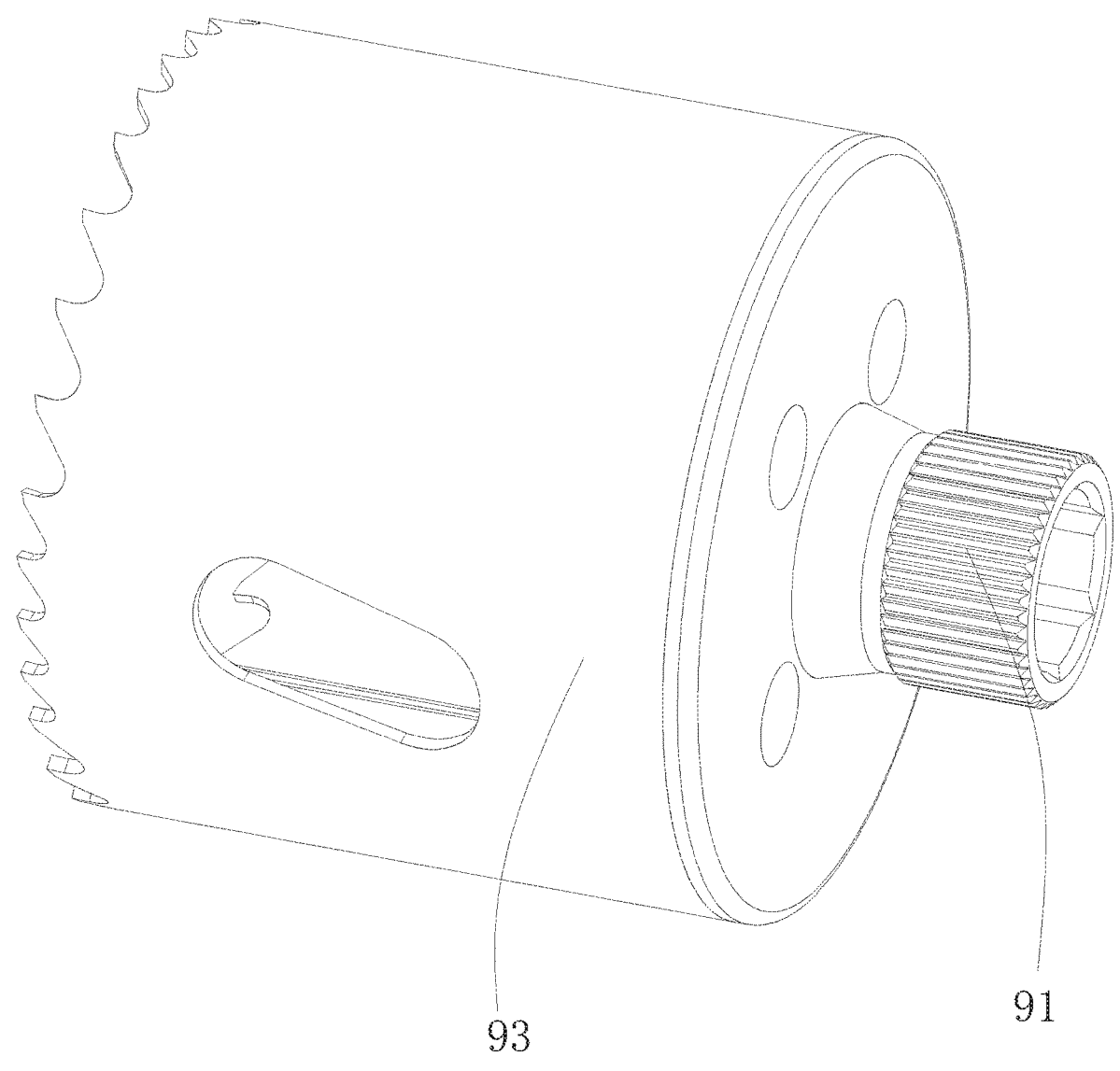
FIG. 11 is a schematic view of the tool (a connector having been connected with a hole saw) according to the present invention.

Furthermore, as shown in FIG. 11, in the embodiment of the present invention, the tool 91 is used for connecting with a hole saw 93, so that the hole saw 93 can be quickly installed into the quick change arbor of the embodiment of the present invention through the tool 91.

Specifically, the locking part 3 is configured as a needle roller. When the locking part 3 is located within the first guiding groove 11, a part of the locking part 3 extends into the assembling position 101 from the notch 1101. The locking part 3 OF needle-roller type has a simple structure and can be used in a clamping structure. The above-mentioned quick change effect can be achieved by the scheme through the needle roller moving in the inclined first guiding groove 11.

In the embodiment of the present invention, in order to drive the locking part 3 to move, both ends of the locking part 3 are overhanging ends that extend from both sides of the arbor main body, and both the pulling ring 2 and the elastic component 4 are in contact with the overhanging ends. The overhang ends are used as matching ends, a front end of the pulling ring 2 abuts against one side of the overhanging end, and the elastic component 4 abuts against the other side of the overhanging end, thus to achieve the effects of pushing, pulling and resetting. In addition, in the embodiment of the present invention, the elastic component 4 can configured as a spring.

In the embodiment of the present invention, the pulling ring 2 is sleeved on a periphery of the arbor main body 1, so that the overall appearance of the clamping device is simpler, and the wrapping design can hide the components such as needle rollers and springs inside. Moreover, in this scheme, the front side of the pulling ring 2 is configured as a clasp-type step design, which can facilitate the pulling ring 2 to limit the locking part 3 and to drive the locking part 3 to move.

In the embodiment of the present invention, the arbor main body 1 is further provided with a baffle ring 5, and the elastic component 4 is compressed between the baffle ring 5 and the locking part 3.

According to the scheme of the present invention, as shown in FIG. 1 to FIG. 8, in Embodiment 1, the assembling position 101, which has a connector with a cylindrical periphery is used for installing the tool.

Figure 9:
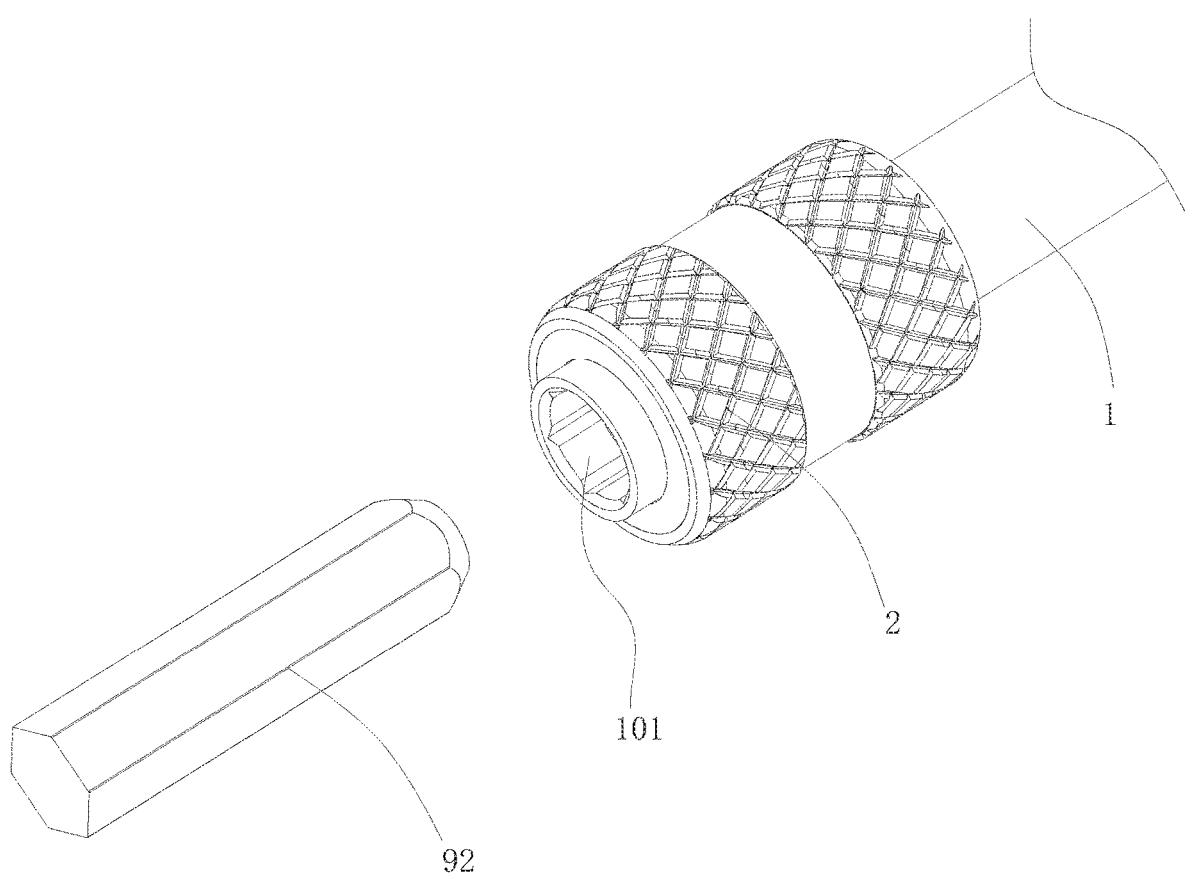
FIG. 9 is a schematic structure view according to embodiment 2 of the present invention.
Figure 10:
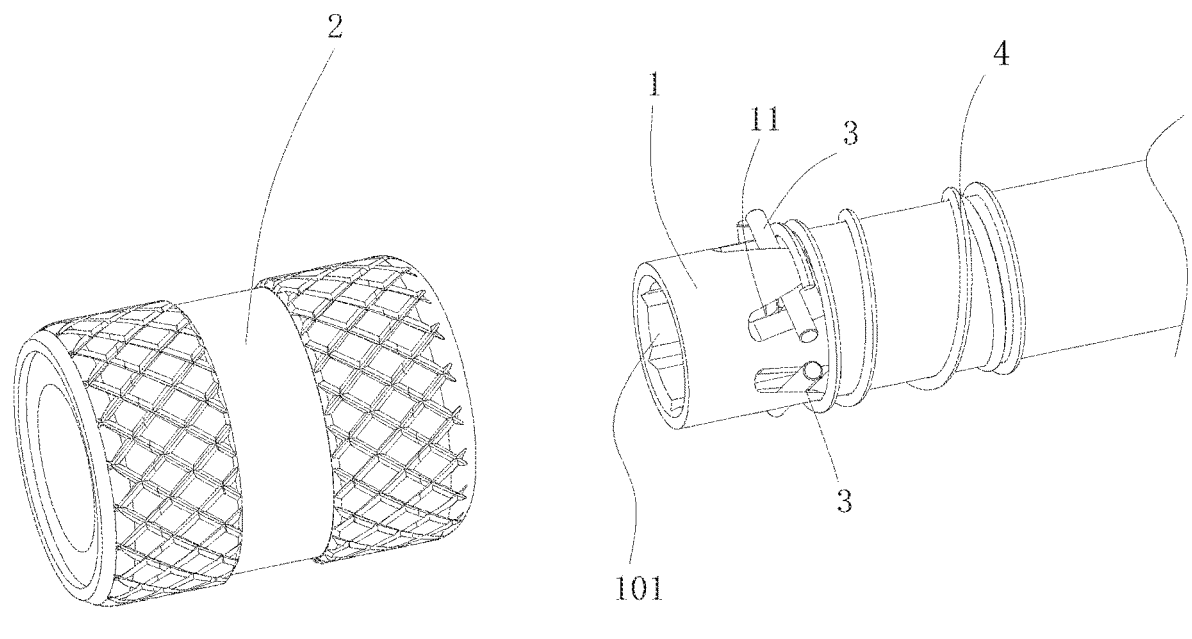
FIG. 10 is an exploded structure view according to embodiment 2 of the present invention.

According to the scheme of the present invention, as shown in FIG. 9 to FIG. 10, in the Embodiment 2, the assembling position 101 is used for installing a tool or an arbor with a polygonal cross-section or a flat periphery. In this embodiment, the arbor main body 1 is further provided with multiple guiding grooves distributed along a circumference with its center, and the multiple guiding grooves all are provided with the locking parts 3. In the present invention, multiple locking parts 3 are used to clamp the tools with flat surfaces or irregular peripherals, so that the structure is more stable after being clamped and more convenient for subsequent use.

The present invention provides a quick change arbor, the tool is positioned and installed in the assembling position through the arbor main body. Besides, the locking part within the first guiding groove abuts against the surface of the tool, so that the tool is tightly locked in the assembling position. In the present invention, the locking part is pushed to the tool under the action of the elastic component, so that the locking part remains in contact with the surface of the tool, which can effectively eliminate the gaps occurred after the tool is assembled. When the tool needs to be disassembled, the tool can be removed from the arbor main body by just pulling the pulling ring to drive the locking part away from the surface of the tool. Therefore, the installation and disassembly of the whole clamping device are very simple, and the locking part does not need to be matched with the tools with groove, which can be applied to more types of tools to be clamped and used.

It should be understood that the terms "first", "second" and so on used in the present invention are used to describe various information, but these information should not be limited to these terms, which are only used to distinguish the same type of information from each other. For example, without departing from the scope of the present invention, "first" information can also be referred to as "second" information, and similarly, "second" information can also be referred to as "first" information. In addition, the terms "center", "upper", "lower", "left", "right", "vertical", "horizontal", "inside", "outside" and so on indicate orientations or positional relationships based on those shown in the accompanying drawings, only for the purposes of facilitating the descriptions of the present invention and simplifying the descriptions, but are not intended to indicate or imply that the device or element referred to must have a particular orientation, be constructed and operated in a particular orientation, and therefore cannot be construed as limitations of the present invention.

The above described are only some preferred embodiments of the present invention. It should be noted that, for those skilled in the art, any modifications, equivalent replacements and improvements made within the spirits and principles of the present invention should be all included in the protection scope of the present invention.

What is claimed is:

1. A quick change arbor, comprising an arbor main body, a pulling ring and a locking part: wherein the arbor main body is provided with an assembling position, and the assembling position is used for installing a tool;

the arbor main body is further provided with a first guiding groove, the first guiding groove and a central axis of the assembling position are arranged obliquely, and the first guiding groove is provided with a notch that communicates with the assembling position;

the locking part is arranged within the first guiding groove, and the locking part extends into the assembling position from the notch and abuts against the tool in the assembling position; and the pulling ring is movably arranged on the arbor main body, the pulling ring is used for driving the locking part to move away from the notch along the first guiding groove: the arbor main body is further provided with an elastic component, and the elastic component is used for pushing and pressing the locking part toward the notch.

2. The quick change arbor according to claim 1, wherein an inclination angle between the first guiding groove and a central axis of the assembling position is less than a self-locking angle.

3. The quick change arbor according to claim 1, wherein the locking part is configured as a needle roller, when the locking part is located in the first guiding groove, and a part of the locking part extends into the assembling position from the notch.

4. The quick change arbor according to claim 2, both ends of the locking part are overhanging ends that extend from both sides of the arbor main body, and both the pulling ring and the elastic component are in contact with the overhanging ends.

5. The quick change arbor according to claim 4, wherein the pulling ring is sleeved on a periphery of the arbor main body.

6. The quick change arbor according to claim 4, wherein the arbor main body is further provided with a baffle ring, and the elastic component is compressed between the baffle ring and the locking part.

7. The quick change arbor according to claim 1, wherein the assembling position is used for installing the tool with a cylindrical periphery or the tool with a polygonal cross-section.

\* \* \* \* \*